United States Patent [19]

Ristic et al.

[11] Patent Number: 5,487,305
[45] Date of Patent: Jan. 30, 1996

[54] THREE AXES ACCELEROMETER

[75] Inventors: Ljubisa Ristic, Phoenix; Ronald J. Gutteridge, Paradise Valley; Wu Koucheng; Michael F. Calaway, both of Phoenix; William C. Dunn, Mesa, all of Ariz.

[73] Assignee: Motorola, Inc., Schaumburg, Ill.

[21] Appl. No.: 274,128

[22] Filed: Jul. 12, 1994

Related U.S. Application Data

[63] Continuation of Ser. No. 810,063, Dec. 19, 1991, abandoned.

[51] Int. Cl.$^6$ .................................................. G01P 15/125
[52] U.S. Cl. ........................ 73/514.32; 73/514.18; 73/514.24
[58] Field of Search ........................ 73/517 R, 517 B, 73/510; 361/280

[56] References Cited

U.S. PATENT DOCUMENTS 4,342,227  8/1982  Petersen et al. ................ 73/517 R
4,941,354  7/1990  Russell et al. .................. 73/517 B
5,249,465  10/1993  Bennett et al. ................ 73/517 B

*Primary Examiner*—John E. Chapman
*Attorney, Agent, or Firm*—Eugene A. Parsons

[57] ABSTRACT

A three axis accelerometer includes a semiconductor substrate with a plurality of layers of conductive material formed thereon by semiconductor manufacturing techniques, with each layer defining a plane and mounted in parallel spaced relation to each other. A first of the layers is fixedly mounted and a second layer is mounted for limited movement relative to the first layer with the first and second layers forming a first capacitance varying in accordance with acceleration of the accelerometer along a first axis defined by the first and second layers. A plurality of first surfaces and a plurality of electrically isolated plates are formed as a portion of the first and the second layers, respectively, and positioned in parallel juxtaposition, with the plates being moveable relative to the first layer. The first surfaces and the plates defining mutually orthogonal second and third axes with each other and the first axis and forming capacitances which vary in accordance with acceleration in the second and third axes.

14 Claims, 7 Drawing Sheets ns5,487,305

THREE AXES ACCELEROMETER

This application is a continuation of prior application Ser. No. 07/810,063, filed Dec. 19, 1991, abandoned.

The present invention pertains to accelerometers and more specifically to accelerometers that are capable of measuring acceleration along three mutually orthogonal axes.

BACKGROUND OF THE INVENTION

In attempts to reduce the size and cost of accelerometers, many different types of acceleration sensing structures have been devised. These structures include capacitive devices and piezoresitive devices, some of which are constructed using semiconductor manufacturing techniques and/or bulk micromachining. The capacitive devices generally consist of a conductive plate, formed of metal or the like, which is mounted on a substrate for movement relative thereto. The plate is positioned parallel to a planar surface of the substrate and forms one or more capacitances therewith. When the plate moves, due to an acceleration force thereon, the capacitances change. This change is sensed by connected electronic circuits and converted to a signal representative of the acceleration.

Accelerometers are useful in inertial guidance systems to sense movement, or acceleration, of a vehicle in all directions. From this information the position of the vehicle can be determined at all times. Accelerometers, such as those described above, are manufactured as a single axis device. To obtain an indication of movement in all directions, three of the prior art accelerometers must be positioned so that the sensitive axes are mutually orthogonal. This means that the final package is still relatively large since one or more of the accelerometers must be positioned at an angle to the others and the entire package can never be formed as a single planar package. Further, since each accelerometer is constructed on a separate semiconductor substrate, signals must be communicated between chips. It is a well known fact that large amounts of power are required to amplify, buffer and communicate signals between chips.

SUMMARY OF THE INVENTION

It is a purpose of the present invention to provide a new and improved accelerometer capable of measuring acceleration along three mutually orthogonal axes.

It is a further purpose of the present invention to provide a three axis accelerometer that is produced by semiconductor processes and is easier to manufacture, as well as relatively inexpensive and small.

These and other purposes are met by a three axis accelerometer formed on a semiconductor substrate.

These and other purposes are further met by a three axis accelerometer including a plurality of layers of conductive material each generally defining a plane and each mounted so the defined planes are parallel with and in spaced relation to each other. A first of the layers is fixedly mounted with a second layer mounted for limited movement relative to the first layer. The first and second layers form a first capacitance varying in accordance with acceleration of the accelerometer along a first axis defined by the first and second layers. First and second structures are formed as a portion of the first and the second layers, respectively, and positioned in parallel juxtaposition, with the second structures being moveable with the second layer and relative to the first layer. The first and second structures are further formed to define second and third axes mutually orthogonal with each other and the first axis, and variable capacitances are formed between the first and second structures, which capacitances vary in accordance with acceleration in the second and third axes, respectively.

BRIEF DESCRIPTION OF THE DRAWINGS

Referring to the drawings.

DESCRIPTION OF THE PREFERRED EMBODIMENTS

Figure 1:
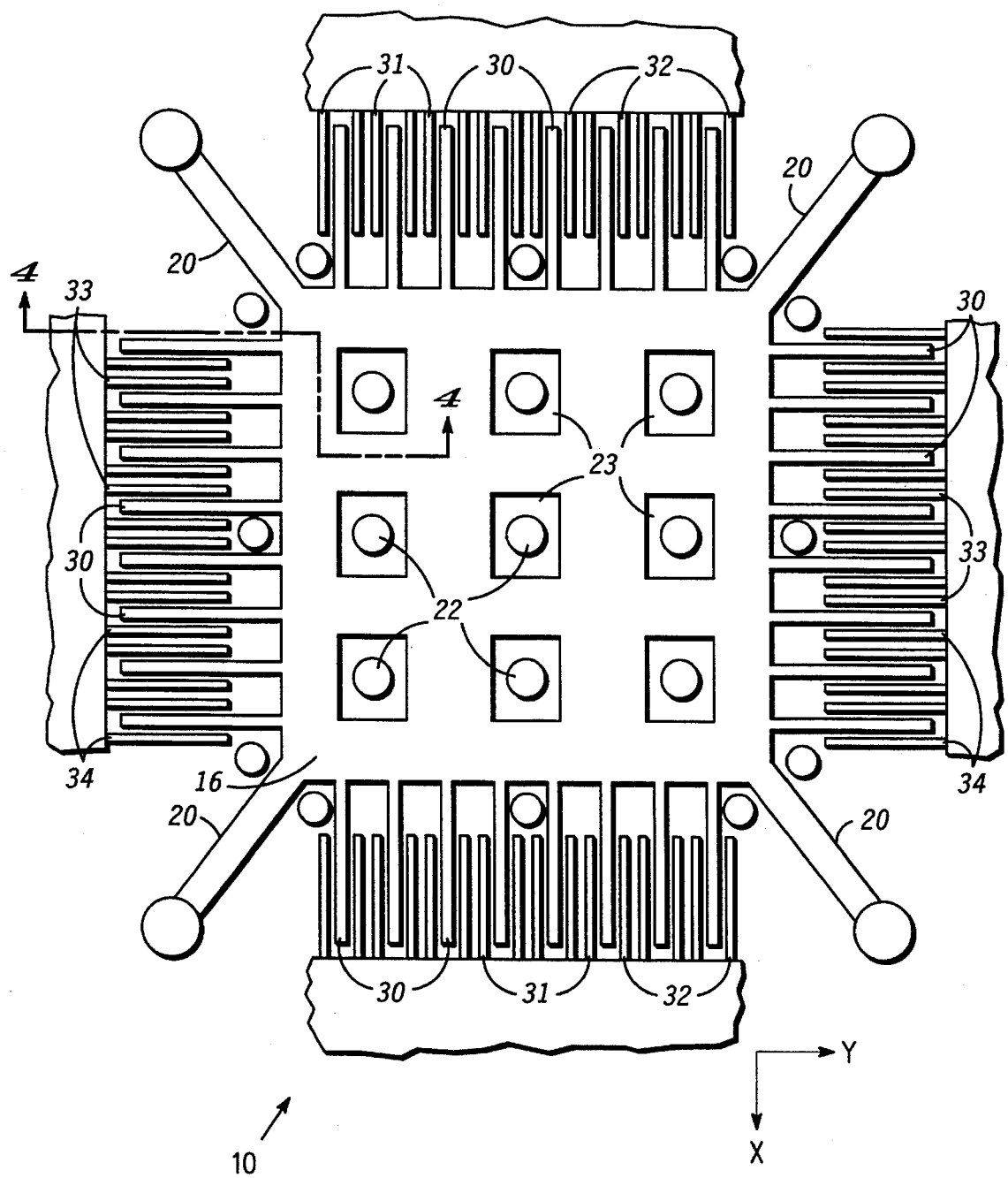
FIG. 1 is an enlarged view in top plan of a three axis accelerometer, portions thereof removed, embodying the present invention.

Referring specifically to FIG. 1, a three axes accelerometer 10 is illustrated, which is an embodiment of the present invention. Accelerometer 10 is illustrated in top plan with portions thereof removed to provide a better view of internal structure.

Accelerometer 10 includes a substrate 12 with a first conductive layer 14 (illustrated in FIG. 4) fixedly positioned on substrate 12. A second conductive layer 16 is positioned parallel to and spaced from first conductive layer 14. Layer 16 is mounted for relative movement by means of four supporting arms 20, each fixedly attached at one end to substrate 12 and diagonally attached at the other end to separate corners of layer 16. Arms 20 are constructed to allow limited movement of layer 16 in two orthogonal axes (X and Y) parallel to the surface of substrate 12 and in a third axis (Z) perpendicular to substrate 12. In the present embodiment, arms 20 are illustrated simply as a straight cantilever configuration. It should be understood, however, that more complex configurations can be incorporated if desired to improve the sensitivity.

A plurality of vertical posts 22, which in this specific embodiment are formed of polysilicon, are supported at one end by substrate 12 and they fixedly support a third conductive layer 24 (see FIG. 4) with respect to substrate 12. In this specific embodiment, twelve posts 22 are positioned beyond the outer edges of layer 16 and nine posts extend through openings 23 in layer 16, which openings 23 provide sufficient space for movement of layer 16 relative to posts 22 without physical contact therebetween. While a relatively large number of posts 22 are utilized herein to prevent any substantial movement of layer 24, it should be understood that many other structures including different numbers of posts, different positions and different configurations may be utilized for the fixed positioning of layer 24.

In this specific embodiment, each of the conducting layers 14, 16 and 24 are constructed with a portion having a generally rectangular configuration and the rectangular portions are positioned in overlying spaced apart relationship with the movable rectangular portion of layer 16 positioned between the fixed rectangular portions of layers 14 and 24. Thus, a variable capacitance 26 (see FIG. 4) is formed between the rectangular portions of layers 14 and 16, which capacitance 26 varies in accordance with relative movement between the rectangular portions of layers 14 and 16 due to acceleration along the Z axis. Similarly, a variable capacitance 27 is formed between the rectangular portions of layers 16 and 24, which varies opposite to variations of capacitance 26.

Each of the rectangular portions of layers 14 and 16 have structures affixed thereto for sensing movement along the X and Y axes. In this specific embodiment the structures are a plurality of projections, or interdigitated fingers, that are formed as an integral portion of each of the rectangular portions within layers 14 and 16. Layer 16 includes a plurality of parallel, spaced apart fingers 30 extending outwardly, in the plane of layer 16, from each of the four sides of the rectangular portion of layer 16. Four groups of electrically attached fingers 31, 32, 33 and 34, each including a similar plurality of parallel, spaced apart fingers, are fixedly attached to layer 14 and extend inwardly, in the plane of layer 16, toward each of the four sides of the rectangular portion of layer 16. Fingers 31, 32, 33 and 34 are further positioned so that each finger is parallel to a finger 30 and adjacent thereto on a longitudinal side thereof so as to produce a capacitance therebetween. In addition, fingers 31 and 32 are positioned parallel to the X axis and on opposite sides of the fingers 30 which are parallel to the X axis and fingers 33 and 34 are positioned parallel to the Y axis and on opposite sides of the fingers 30 which are parallel to the Y axis.

Fingers 30, 31 and 32 are positioned in groups along the upper and lower sides (in FIG. 1) of the rectangular portion of layer 16 so as to define the X axis, extending from the top of FIG. 1 to the bottom, and fingers 30, 33 and 34 define the Y axis, extending from the left side of FIG. 1 to the right side. For convenience of construction, all of layer 16 is adapted to be connected to a common potential through mounting arms 20. Fixed fingers 31 and 32 lying parallel to the X axis, on both sides of the rectangular portion of layer 16, are divided into two groups: all fingers 31 are connected together and all fingers 32 are connected together to form variable capacitances 36 and 37 (see FIG. 3) in combination with adjacent, movable fingers 30. Fingers 30 and 31 form capacitor 36 and fingers 30 and 32 form capacitor 37. Fixed fingers 33 lying parallel to the Y axis, on both sides of the rectangular portion of layer 16, are connected together to form one variable capacitance 38 (see FIG. 3) in combination with adjacent, movable fingers 30. Fixed fingers 34 are similarly connected to form variable capacitance 39 in combination with fingers 30.

Figure 2:
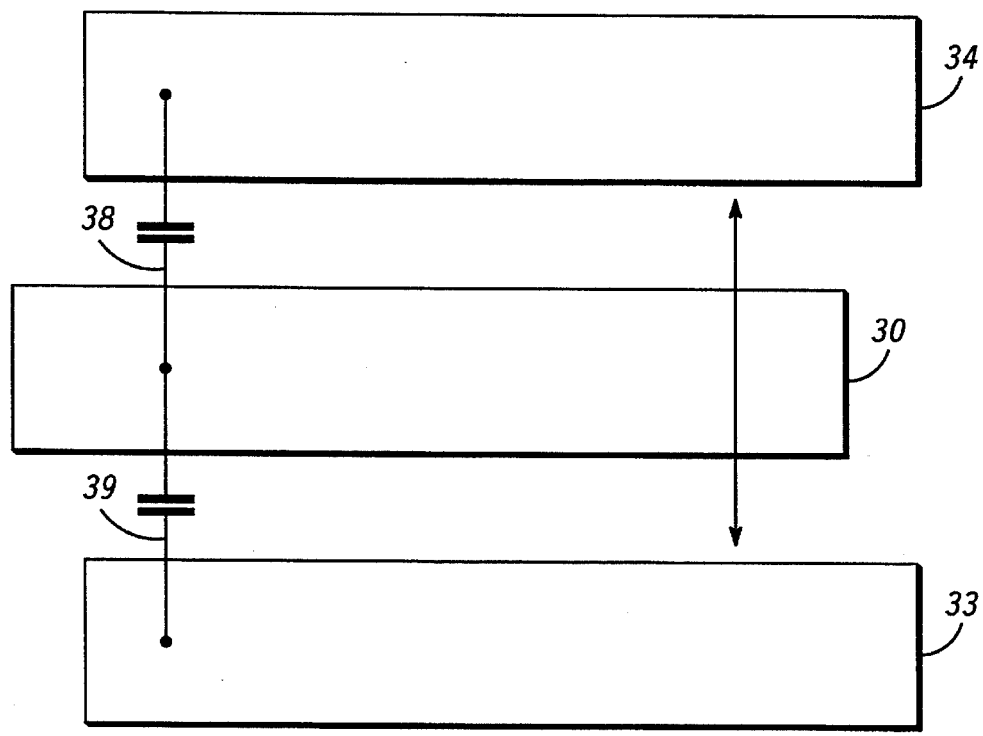
FIG. 2 is a greatly enlarged view of a portion of the structure illustrated in FIG. 1.

FIG. 2 illustrates a greatly enlarged view in top plan of three parallel adjacent fingers 30, 33 and 34. Because the fingers are placed in close parallel proximity, a capacitance is formed therebetween. While the capacitance between pairs of finger is very small, because the fingers are very small, by connecting pluralities of the fingers in parallel a reasonably sized capacitance, on the order of one half picofarad, is obtained. As fingers 30 move laterally towards fingers 33 and away from fingers 34, the capacitance therebetween varies. The variations in capacitance are sensed by electronic circuitry which converts the capacitance changes into signals representing the acceleration which caused the movement of fingers 30.

Figure 3:
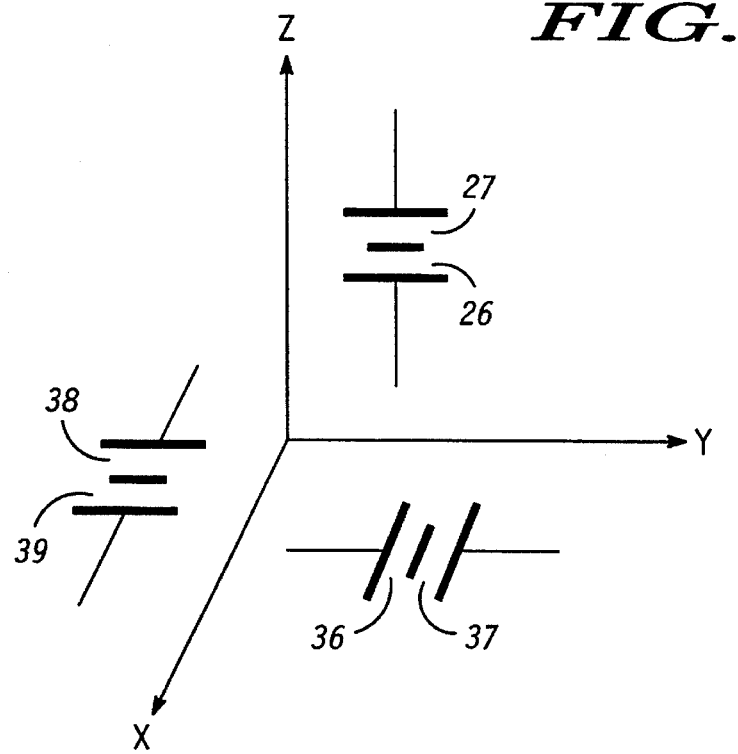
FIG. 3 is a simplified schematic representation of the structure illustrated in FIG. 1.

FIG. 3 illustrates the three mutually orthogonal axes and the related capacitances. As accelerometer 10 is accelerated along the Z axis, the capacitances 26 and 27 vary oppositely, one increases while the other decreases, so that the change in capacitance is increased and easier to detect. As accelerometer 10 is accelerated along the Y axis, the capacitances 36 and 37 vary oppositely and as accelerometer 10 is accelerated along the X axis, the capacitances 38 and 39 vary oppositely.

Figure 4:
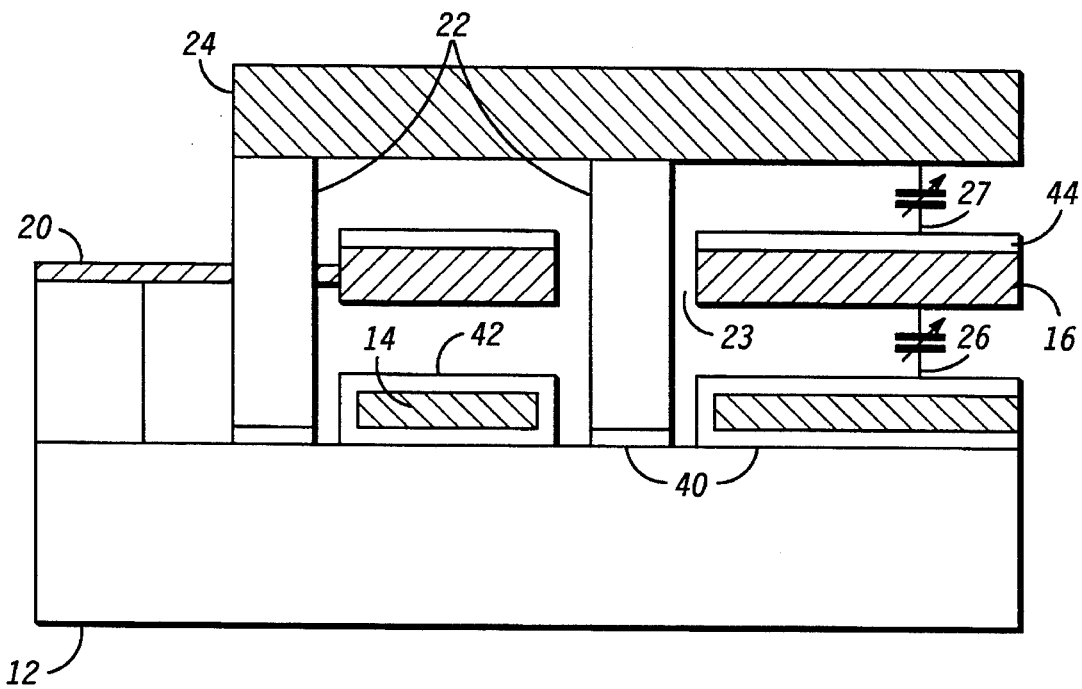
FIG. 4 is a highly enlarged cross-sectional view of a portion of the structure illustrated in FIG. 1, as seen from the line 4—4 of FIG. 1.

FIG. 4 illustrates a partial sectional view as seen from the line 4—4 in FIG. 1. An insulation layer 40 is formed on the planar surface of substrate 12 and layer 14 is deposited thereon. Layer 14 is insulated from substrate 12 by layer 40 so that substrate 12 can be doped or otherwise used to provide a conductive path between various components, as is well known in the semiconductor art. An insulation layer 42 is formed around layer 14 so there is no possibility of layer 16 moving sufficiently far to produce an electrical short between layers 14 and 16. Posts 22 are formed of insulating and conductive materials, in the openings 23 so as to be supported by substrate 12. A first sacrificial layer of material (not shown), such as phosphosilicate glass, is conformally deposited on substrate 12 and layer 42. The thickness of the first sacrificial layer is varied in accordance with the spacing desired between conductive layers 14 and 16. Layer 16 is preferentially deposited on the first sacrificial layer and an insulating layer 44 is deposited thereon to prevent electrical contacts between layers 16 and 24. A second sacrificial layer, not shown, is conformally deposited on layer 44 and other open areas. Again, the thickness of the second sacrificial layer is varied to obtain the desired spacing between layers 16 and 24. Layer 24 is preferentially deposited on the second sacrificial layer so as to be in supporting contact with posts 22 and in overlying relationship to layer 16. The sacrificial layers are then removed by some convenient etching process and the structure illustrated in FIG. 4 is obtained. It will of course be understood that many intermediate steps have been omitted from this description because they are well known to those skilled in the art of micromachining and do not form a portion of this embodiment.

FIGS. 5, 6, 7 and 8 illustrate another embodiment of a three axis accelerometer, generally designated 50, which embodies the present invention.

Figure 5:
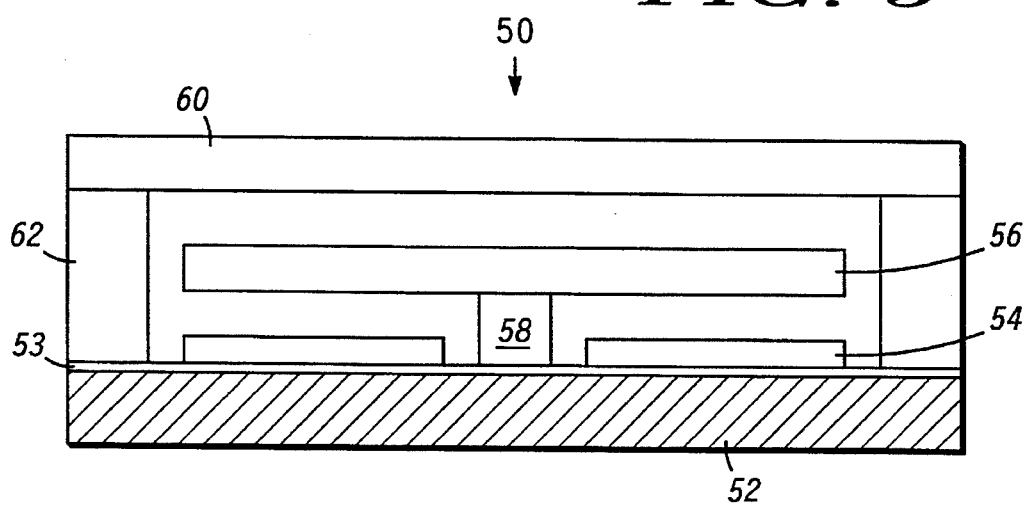
FIG. 5 is a somewhat simplified cross-sectional view of another three axis accelerometer embodying the present invention, generally illustrating the physical relationship of the various components.

Referring specifically to FIG. 5, it can be seen that accelerometer 50 is formed on a substrate 52 and includes an insulative layer 53 and a first conductive layer 54 supported on the insulative layer 53. A second conductive layer 56 is supported on a centrally positioned post 58, which is in turn supported on insulative layer 53. Layer 56 is positioned in overlying, spaced relationship relative to layer 54 and is movable with relation thereto, as will be explained presently. A third conductive layer 60 is fixedly positioned in spaced apart overlying relationship, relative to layer 56, by means of pillars 62 (see FIGS. 5 and 6) extending from the outer periphery of layer 60 to insulative layer 53. The various layers are formed by well known micromachining techniques and by the use of sacrificial layers, as explained above, and will not be described further.

Figure 6:
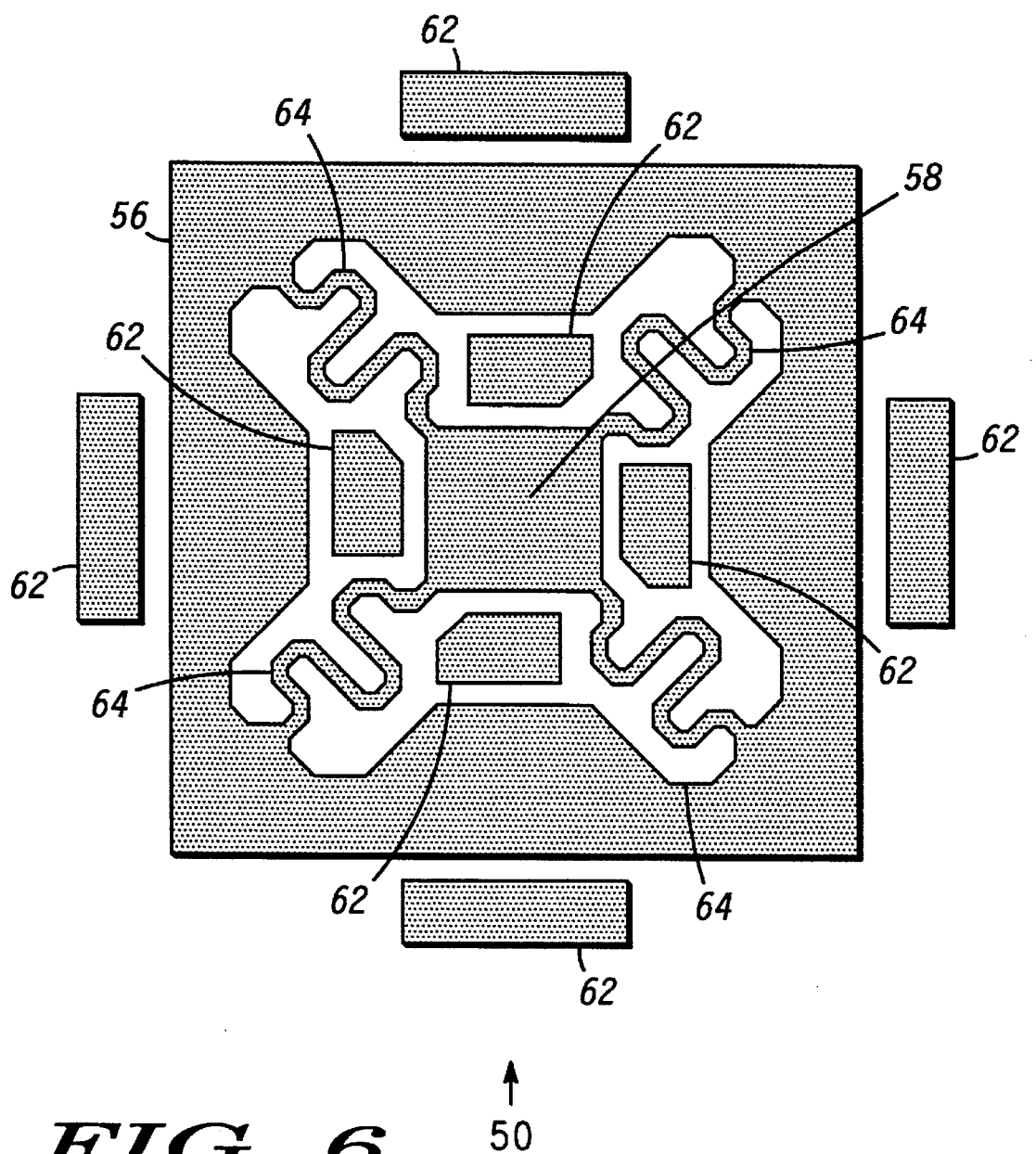
FIG. 6 is a view in top plan of a second layer of the accelerometer illustrated in FIG. 5.

FIG. 6 is a view in top plan of layer 56, with pillars 62 illustrated in section to show the relative position thereof. Layer 56 is a generally square, planar mass affixed to central mounting post 58 by means of four arms 64. Arms 64 are formed with a sinuous central portion that provides a spring-like action to allow movement of layer 56 in any direction relative to mounting post 58.

Figure 7:
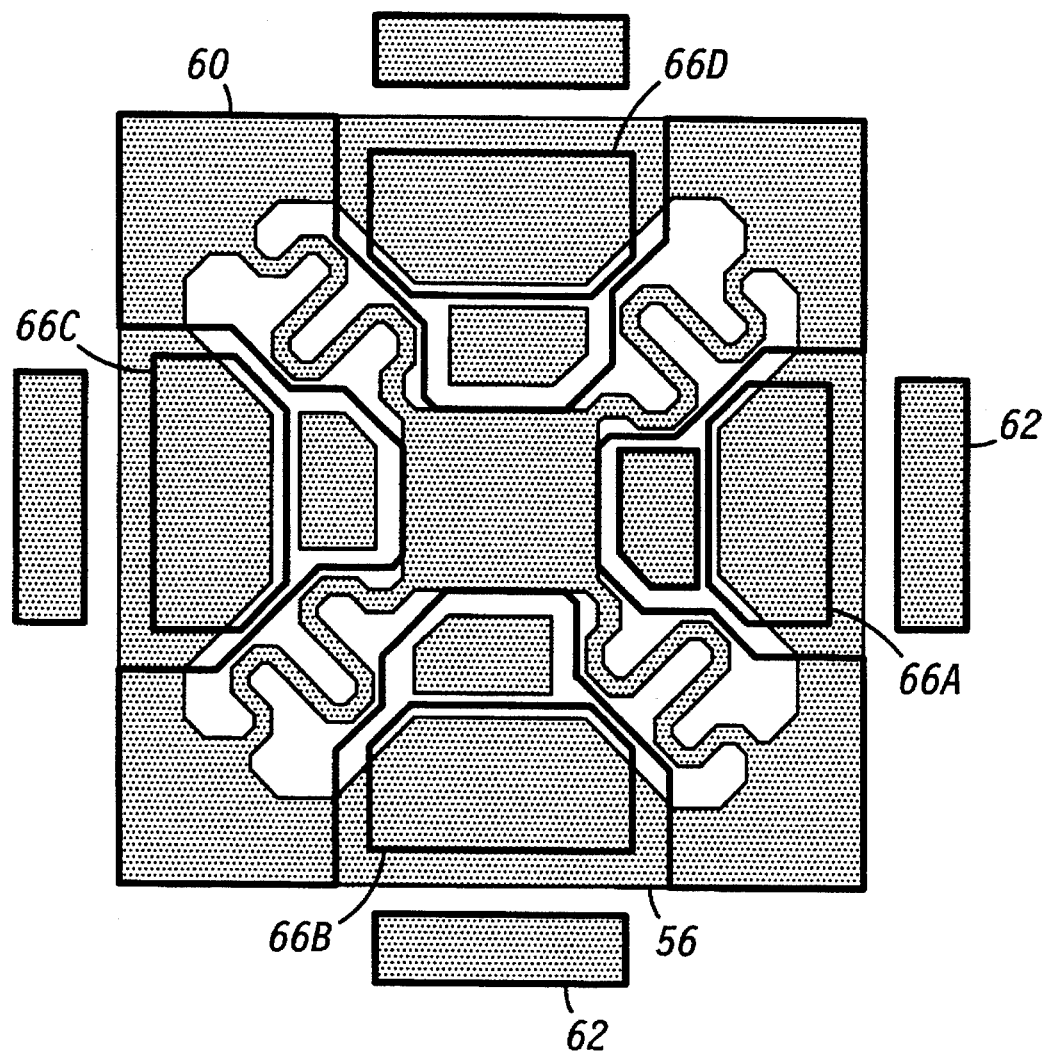
FIG. 7 is an enlarged view in top plan of the accelerometer illustrated in FIG. 5.

FIG. 7 is a view in top plan of layer 60 positioned over layer 56 to illustrate the relative positions of the various portions. Layer 60 includes four generally rectangular conducting plates 66A–66D, each having two truncated corners to coincide with similarly shaped portions of layer 56. Each of the plates 66A–66D cooperates with layer 56 to form a capacitance 67A–67D, respectively (see FIG. 9), and similar plates in layer 54 cooperate with layer 56 to form capacitances 68A–68D (see FIG. 9). Plates 66A and 66C are positioned to define the Y axis. Plates 66B and 66D are positioned to define the X axis. The Z axis is defined by layers 54, 56 and 60 and is perpendicular to the surface of substrate 52. Thus, three mutually orthogonal axes are defined and the capacitors 67A–67D and 68A–68D are positioned to sense acceleration therealong.

Figure 8:
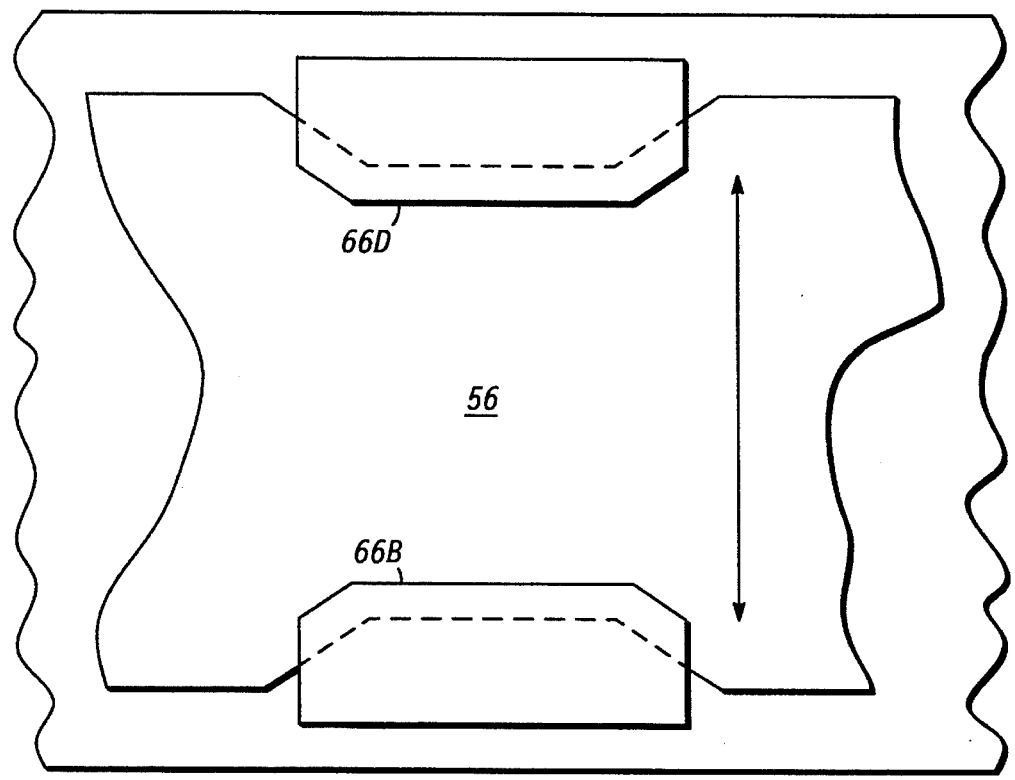
FIG. 8 is a greatly enlarged view in top plan of a portion of the accelerometer illustrated in FIG. 5.
Figure 9:
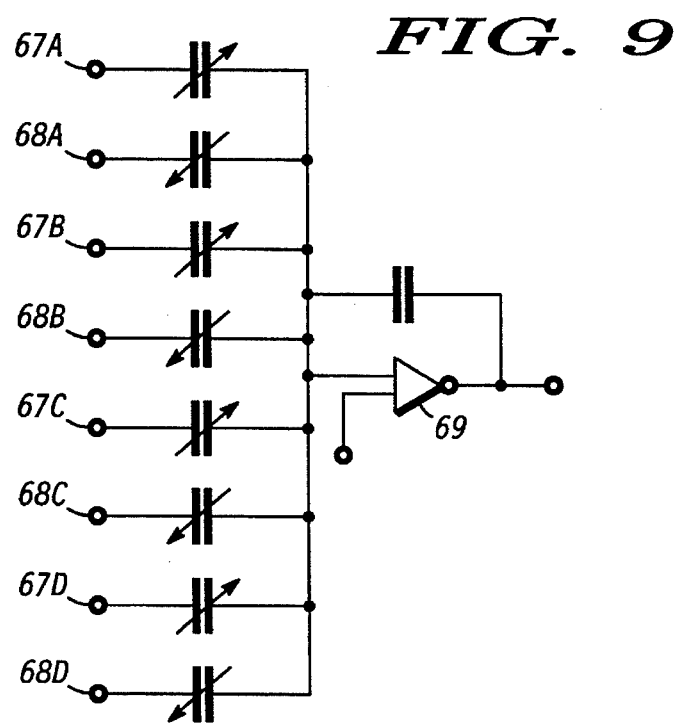
FIG. 9 is a schematic representation of the sensing circuit of the accelerometer illustrated in FIG. 5.

FIG. 8 is a greatly enlarged view in top plan of portions of layer 56 and plates 66B and 66D, illustrating in more detail the manner in which capacitances 67B and 67D are varied. As an acceleration force along the X axis causes layer 56 to move in the direction of the top of FIG. 8, more of plate 66B overlies layer 56 causing capacitance 67B to increase. Also less of plate 66D overlies layer 56, causing capacitance 67D to decrease. Similarly, capacitances 68B and 68D, between layer 56 and layer 54 will increase and decrease, respectively. Thus, capacitances 67B, 67D, 68B and 68D are used in a differential electronic circuit to sense the acceleration along the X axis. Similarly, capacitances 67A, 67C, 68A and 68C are used to sense the acceleration along the Y axis. FIG. 9 illustrates capacitances 67A–67D and 68A–68D connected to a comparator 69 in a typical sensing circuit. Comparator 69 compares the input signal received from the capacitances to a reference signal to determine any change in capacitance.

Figure 10:
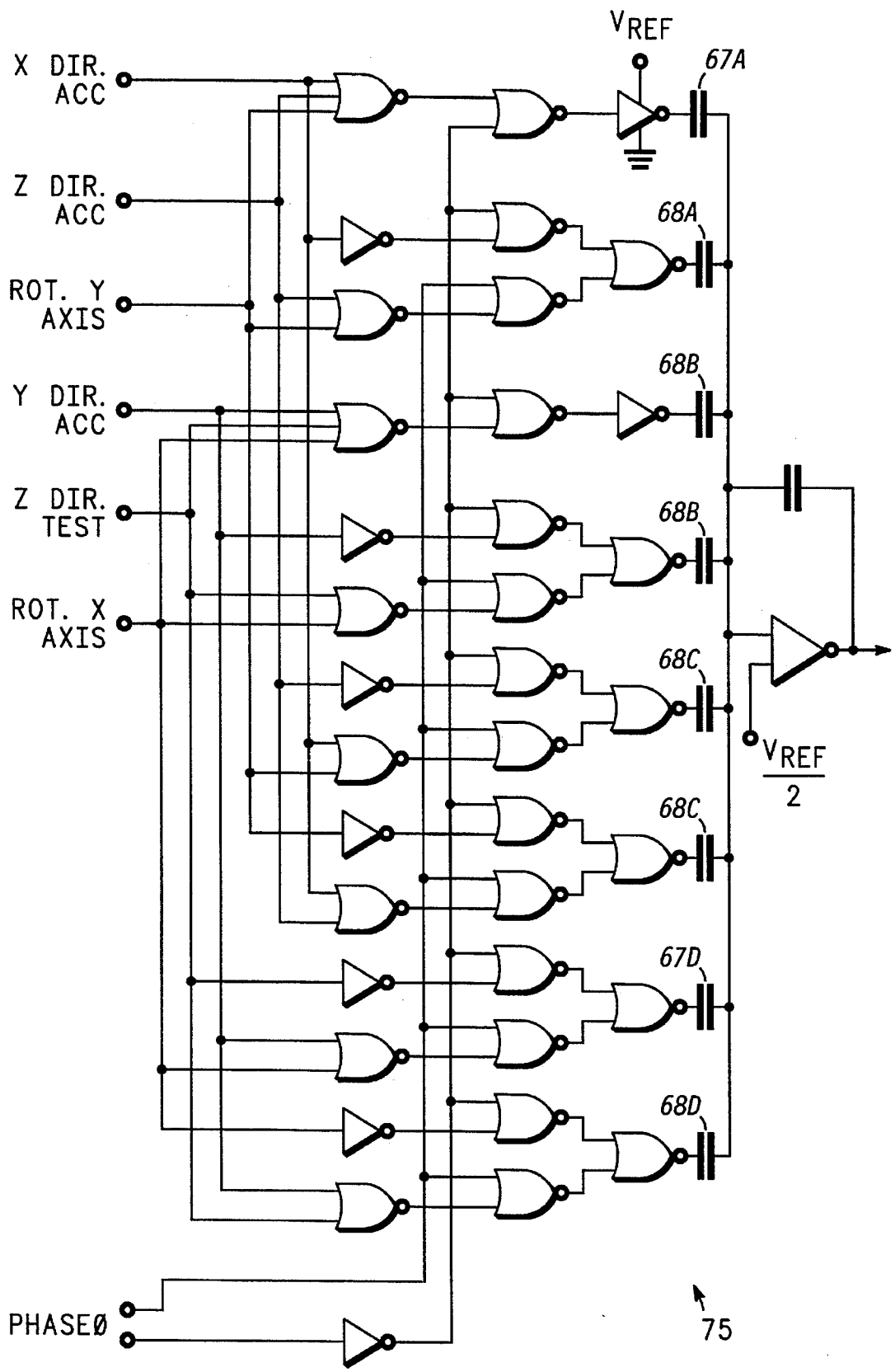
FIG. 10 is a schematic diagram of a driving circuit for the accelerometer of FIG. 5, including the sensing circuit of FIG. 9.

Referring to FIG. 10, a switching, or driving, circuit 75 is illustrated, including the sensing circuit of FIG. 9. By sensing changes in various capacitances, the following functions can be performed:

| FUNCTION | CAPACITANCES DRIVEN |
| --- | --- |
| acceleration in Y direction | 67A + 68A vs 67C + 68C |
| acceleration in X direction | 67B + 68B vs 67D + 68D |
| acceleration in Z direction | 67A + 67C vs 68A + 68C |
| self-test in Z direction | 67B + 67D or 68B + 68D |
| rotation accel. about Y axis | 67B + 68D vs 67D + 68B |
| rotation accel. about X axis | 67A + 68C vs 68A + 67C |

Switching circuit 75 connects the various capacitances into any of the relationships designated above to make the desired measurement and comparator 69 compares the input signal from the capacitances to a reference signal. In this fashion acceleration along three mutually orthogonal axes is measured, rotational acceleration about two of the axes can be measured and at least a portion of the accelerometer and associated circuitry can be tested.

In all of the above described embodiments, a closed loop circuit (not shown), including the sensing capacitors, is formed by using the sensed changes in capacitance to periodically apply an electrostatic force to center the movable member between capacitive structures. That is, the closed loop maintains the movable member as close to the at-rest position as possible and still generate sense signals. This is accomplished generally by driving the capacitive structures to produce an electrostatic force to center the movable member and sensing the amount of drive required for the centering process. The amount of drive required is proportional to the acceleration forces moving the movable member. By forming a closed loop circuit including the sensing capacitors, the operating range and the sensitivity are substantially increased.

Thus, embodiments of a new and improved three axes accelerometer are disclosed. The disclosed accelerometer senses acceleration in three mutually orthogonal axes, senses rotational acceleration about two of the axes and includes some self test features. The various embodiments disclosed are formed by using micromachining techniques and semiconductor material, such as silicon, polysilicon, various deposited metal layers, or any material normally used in producing semiconductor products. Because of the novel construction, the accelerometer can be made sensitive to low acceleration forces and is still rugged. The circuitry associated with the accelerometer is relatively simple and the entire structure has good frequency response. Also, because of the use of differential capacitances, there is good cross axis sensitivity and cross-talk between axes is minimized. These and other advantages should be apparent to those skilled in the art from the above disclosure.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A three axis accelerometer comprising:

a semiconductor substrate;

a plurality of layers of conductive material formed on the substrate, each layer of conductive material generally defining a plane and each mounted so the defined planes are parallel with and in spaced relation to each other, a first of the layers being fixedly mounted and with a second layer being mounted by a plurality of flexible arms each having a first end attached to a center post supported on the substrate and a second end attached to support the second layer for limited movement of the second layer relative to the first layer;

the first and second layers forming a first capacitance varying in accordance with acceleration of the accelerometer along a first axis perpendicular to the first and second layers;

a plurality of first surfaces and a plurality of electrically isolated plates formed as a portion of the second and the first layers, respectively, and positioned in parallel juxtaposition, the plurality of first surfaces being moveable with the second layer and relative to the first layer, the plurality of first surfaces and the plurality of electrically isolated plates being further formed to define second and third axes mutually orthogonal with each other and the first axis; and variable capacitances being formed between the plurality of first surfaces and the plurality of electrically isolated plates, which capacitances vary in accordance with acceleration in the second and third axes, respectively.

2. A three axes accelerometer as claimed in claim 1 wherein the plurality of conducting layers includes a third layer fixedly positioned relative to the first layer and with the second layer positioned between the first and third layers, the second and third layers forming a second capacitance that varies in accordance with acceleration of the accelerometer along the first axis, which variations are opposite to the variations in the first capacitance.

3. A three axes accelerometer as claimed in claim 2 including in addition a plurality of second plates, similar to the first plates, formed as a portion of the third layer.

4. A three axes accelerometer as claimed in claim 3 wherein the pluralities of first and second surfaces are defined on conductive plates positioned in parallel spaced apart relationship.

5. A three axes accelerometer as claimed in claim 1 wherein the plurality of layers are supported by a semiconductor substrate and the substrate further supports circuitry connected to the first capacitance and the variable capacitances to provide signals indicative of acceleration in the first, second and third axes.

6. A three axes accelerometer as claimed in claim 5 wherein the accelerometer and the circuitry are formed in a single integrated circuit.

7. A three axes accelerometer as claimed in claim 1 wherein the single post is a generally centrally positioned post perpendicular to the plane of the first and the plane of the second layers.

8. A three axis accelerometer comprising:

a semiconductor substrate;

a first layer of conductive material formed on the substrate and generally defining a plane;

a second layer of conductive material mounted by a plurality of flexible arms each having a first end attached to a center post supported on the substrate and a second end attached to support the second layer and with a major surface of the second layer in spaced relation from the first layer and parallel to the plane for limited movement relative to the first layer;

a third layer of conductive material supported on the substrate and fixedly mounted relative to the first layer and parallel to the plane, the third layer being mounted adjacent and in spaced relation from a second major surface of the second layer;

the first and second layers forming a first capacitance and the second and third layers forming a second capacitance, each formed capacitance varying in accordance with acceleration of the accelerometer along a first axis defined by the first, second and third layers;

conductive plates formed as a portion of the first layer and a portion of the third layer and electrically isolated conductive surfaces formed as a portion of the second layer, the various conductive plates being positioned in juxtaposition with the conductive surfaces formed as a portion of the second layer moveable with the second layer, relative to the first and third layers, the surfaces and plates being further formed to define second and third axes mutually orthogonal with each other and the first axis; and variable capacitances being formed between the various conductive surfaces and conductive plates which variable capacitances vary in accordance with acceleration in the second and third axes.

9. A three axes accelerometer as claimed in claim 8 wherein the surfaces are defined on conductive plates positioned in parallel spaced apart relationship.

10. A three axes accelerometer as claimed in claim 8 wherein the first, second and third layers of conductive material are formed of doped semiconductor material.

11. A three axes accelerometer as claimed in claim 10 wherein the semiconductor material is polysilicon.

12. A three axes accelerometer as claimed in claim 8 wherein the substrate further has formed thereon circuitry connected to the first and second capacitances and the variable capacitances to provide signals indicative of acceleration in the first, second and third axes.

13. A three axes accelerometer as claimed in claim 12 wherein the accelerometer and the circuitry are formed in a single integrated circuit.

14. A three axes accelerometer as claimed in claim 8 wherein the center post is a generally centrally positioned post perpendicular to the plane of the first and the plane of the second layers.

* * * * *